United States Patent [19]
Larsson et al.

[11] Patent Number: 5,379,344
[45] Date of Patent: Jan. 3, 1995

[54] SMART CARD VALIDATION DEVICE AND METHOD

[75] Inventors: Stig B. Larsson, Mosman; Christoph T. Hoffmann, Nelson; Phillip C. Dimond, Merrylands, all of Australia

[73] Assignee: Scandic International Pty. Ltd., New South Wales, Australia

[21] Appl. No.: 938,237

[22] PCT Filed: Apr. 26, 1991

[86] PCT No.: PCT/AU91/00164
§ 371 Date: Dec. 23, 1992
§ 102(e) Date: Dec. 23, 1992

[87] PCT Pub. No.: WO91/17524
PCT Pub. Date: Nov. 14, 1991

[30] Foreign Application Priority Data
Apr. 27, 1990 [AU] Australia .................. PJ9863

[51] Int. Cl.⁶ .......................................... H04K 1/00
[52] U.S. Cl. ........................................ 380/23; 380/24; 235/380; 235/382; 235/492
[58] Field of Search ............... 380/23, 24, 25; 235/380, 382, 492

[56] References Cited
U.S. PATENT DOCUMENTS

| | | | |
|---|---|---|---|
| 4,549,075 | 6/1983 | Saada et al. | |
| 4,684,791 | 8/1987 | Bito | |
| 4,849,614 | 7/1989 | Watanabe et al. | |
| 4,874,935 | 10/1989 | Younger | 235/492 |
| 4,885,788 | 12/1989 | Takaragi et al. | |
| 4,965,827 | 10/1990 | McDonald | 380/25 |
| 5,007,089 | 4/1991 | Matyas et al. | 380/25 |
| 5,025,373 | 6/1991 | Keyser et al. | 380/24 |
| 5,026,938 | 4/1993 | Fujioka | |
| 5,068,894 | 11/1991 | Hoppe | 380/25 |
| 5,120,939 | 6/1992 | Claus et al. | 235/382 |
| 5,162,638 | 11/1992 | Diehl et al. | 235/380 |
| 5,237,609 | 8/1993 | Kimura | 380/23 |
| 5,317,636 | 5/1994 | Vizcaino | 380/23 |

FOREIGN PATENT DOCUMENTS

| | | |
|---|---|---|
| 0331407 | 9/1989 | European Pat. Off. |
| 0409701 | 2/1990 | European Pat. Off. |
| 2584514 | 7/1986 | France |
| 2613102 | 3/1988 | France |
| 2646942 | 8/1989 | France |
| 2645303 | 3/1990 | France |
| 2100190 | 12/1982 | United Kingdom |
| WO90/15382 | 3/1990 | WIPO |

OTHER PUBLICATIONS
European Search Report with above-noted reference.

*Primary Examiner*—David C. Cain
*Attorney, Agent, or Firm*—Sixbey, Friedman, Leedom & Ferguson

[57] ABSTRACT

A validation device (2) for a smart card (1) of the kind having unprotected data storage memory (4) and protected data storage memory (5) selectively accessible by means of a user access code. The device (2) performs an encryption upon identification data to produce the user access code and reads identification data from the unprotected memory (4) for further encryption. The access code is supplied to the smart card (1) and selected data from said protected memory (5) is read for encryption to produce validating data. A comparator (8) compares the identification data with the validating data and rejects the smart card (1) if the data do not agree and establishes access to said protected memory (5) if the data do agree.

11 Claims, 4 Drawing Sheets

SMART CARD VALIDATION DEVICE AND METHOD

TECHNICAL FIELD

The present invention relates to a smartcard validation device and method.

The validation device of this invention is particularly suited to applications in which the smartcard is used as a cash substitute. Although the invention will hereinafter be described with reference to this application it is equally useful in a variety other applications including for example security access systems.

BACKGROUND ART

Smartcards are essentially plastic cards with microelectronic circuitry embedded therein. They are also known as "integrated circuit cards" and fall into three categories according to the degree of "intelligence" they possess.

At one end of the scale, a smartcard provide only memory is analogous to a card having a magnetic strip. Information may be stored within the memory but the card has no processing capability, and no ability to restrict access to that memory.

At the middle scale is a card that has memory controlled by a hard wired logic which can restrict access to any or all of the memory until a valid access code has been issued. The same scheme can be used to prevent unauthorised erasing of card memory. The access code can take the form of a personal identification number (PIN). Most sophisticated however is a smartcard in which the processor is able to perform complex functions, such as the performance of algorithms. It is those smartcards falling within the middle scale referred to above to which the present invention relates.

In practice information is transferred to and from the memory of the smartcard when the card is interfaced with a suitable reader/writer device. As such, the information provided on the smartcard may be constantly updated. Preferably, the use of the card should not always require communication with a control database. If the card provides stand-alone operation it will be more flexible in use.

It will be apparent that, in providing a system in which a smartcard is used as a cash substitute, a most important aspect is the provision of a tight security system. Early smartcards utilised a user-key/PIN similar to that used by credit cards or magnetic stripe cards. Access to the smartcard often relies upon the submission of the correct user-key/PIN. Furthermore, the data stored within the card may be encrypted. For a reasonable level of security in the system, two numbers must be managed, namely a user key and an encryption key. Management of these keys involves keeping them secret from potential unauthorised users, and with regular changes. The reason for regular changing of the keys is that, if the user key is intercepted by or revealed to an unauthorised user and access to the card is obtained, copying the card data becomes possible. Further, if the card data is not encrypted, then fraudulent alteration of the data is also possible. In the application of the smartcard as a cash substitute such operations pose serious problems.

A second type of smartcard security method was subsequently developed, using a "signature" or "certificate" to prove the integrity of the contents of the card. However this requires manual input of a further key, therefore this system also requires management of two keys. In this case, however, alteration of the card data without correct calculation of the new certificate may be detected when the card is next used. Moreover, copying the card is prevented since the card memory location which contains the certificate is erased upon access to the contents of the card. Therefore, if the user key alone is intercepted and the card is unlocked, a copy may be made onto a second card but without the encryption key a fresh certificate can not be calculated and the card, or copies, will be rejected when next used.

While an improvement over earlier approaches, these prior art systems still possess the disadvantage that multiple user keys must be managed, with the constant danger that the information will fall into the hands of unauthorised users.

DISCLOSURE OF THE INVENTION

It is an object of the present invention to overcome, or at least ameliorate, the disadvantage presented by the prior art.

Accordingly, there is provided a validation device for a smartcard of the kind having unprotected data storage memory and protected data storage memory selectively accessible by means of a user access code, said device comprising:

- encryption means to perform an encryption upon identification data to produce said user access code;
- means to read identification data from said unprotected memory to said encryption means;
- means to supply said user access code to the smartcard;
- means to read selected data from said protected memory to said encryption means for encryption to produce validating data;
- comparator means to compare said identification data with said validating data and reject the smartcard if the data do not agree; and
- means responsive to said comparator means to establish access to said protected memory if the data do agree.

Preferably, the validation device further comprises memory means for storage of the identification data and the means to read identification data from the unprotected memory erases the unprotected memory after reading the identification data to the memory means.

Preferably, also, the encryption means performs the same encryption algorithm to produce the user access code and the validating data. Preferably, the encryption algorithm employs an encryption key stored in memory.

Preferably, also, the validation device further comprises card locking means responsive to an input indication of termination of use of the smartcard for reading updated selected data from the protected memory to the encryption means for encryption to produce updated validating data, and means to write the updated validating data to unprotected memory to form part of updated identification data.

Preferably, the card locking means generates a new user access code for the smartcard by encryption of the updated identification data and transmits the new user access code to the smartcard.

In a second aspect, the invention provides a method for validating access to smartcards of the kind having unprotected data storage memory and protected data storage memory selectively accessible by means of laser access code, said method including the steps of:

reading identification data from said unprotected memory;

encrypting said identification data to produce a user access code;

supplying said user access code to said smartcard;

reading selected data from said protected memory:

encrypting said selected data to produce validating data;

comparing said identification data with said validating data; and rejecting the smartcard if the data do not agree and establishing access to the protected memory if the data do agree.

Preferably, the method of the invention further includes the step of storing the identification data and erasing the unprotected memory.

Preferably also, the steps of encrypting the identification data and encrypting selected data from the protected memory employ the same encryption algorithm to produce the user access code and the validating data respectively.

Preferably, the encryption steps employ an encryption key stored in read only memory.

Preferably also, the method of the invention further includes the steps of:

responding to an indication of termination of use of the smartcard to read updated selected data from the protected memory;

encrypting said selected data to produce updated validating data; and writing the updated validating data to unprotected memory to form part of updated identification data.

Preferably, the step of writing updated validating data to form part of updated identification data further includes the step of encrypting the updated identification data to produce a new user access code and transmitting the new user access code to the smartcard.

BRIEF DESCRIPTION OF THE DRAWINGS

A preferred embodiment of the invention will now be described, by way of example only, with reference to the accompanying drawings in which.

MODES FOR CARRYING OUT THE INVENTION

Figure 1:
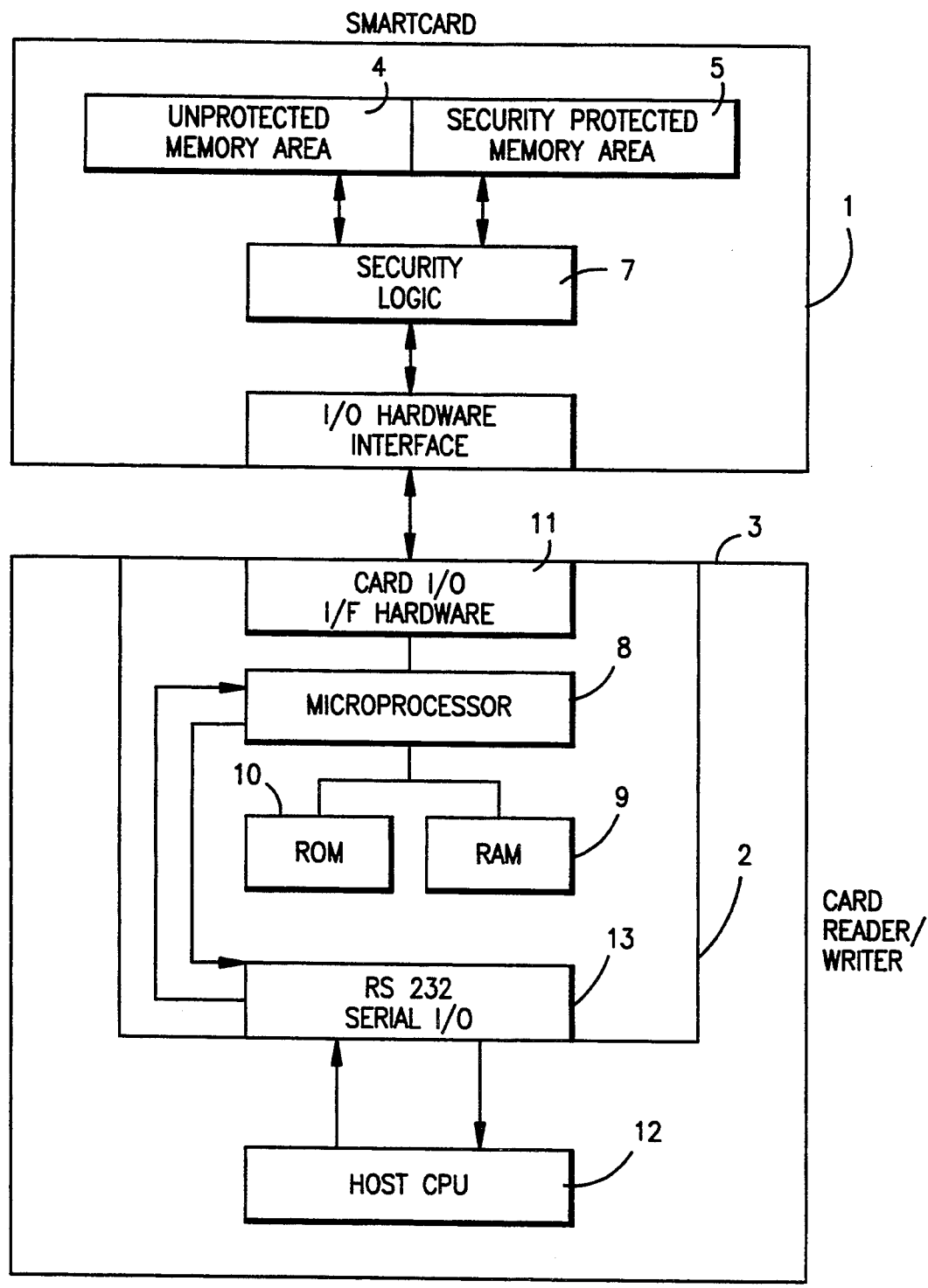
FIG. 1 is a block diagram showing a validation device in accordance with the present invention.

Referring now to FIG. 1, the validation device interfaces to a smartcard 1 by means of a card reader/writer 2. The latter in turn is part of a host system 3, for example, a gaming machine.

The smartcard 1 consists of two types of EEPROM memory. A first portion is accessible at any time and is termed the unprotected memory 4. The remaining portion is accessible only after presentation of a "key" or PIN to the card and is termed the protected memory 5. In addition, the card contains input/output hardware 6, security logic 7 which controls access to the EEPROM memories 4 and 5, and the interconnecting data and address buses (not shown).

The smartcard reader/writer 2 consists of a microprocessor 8, a RAM 9, a ROM 10, an input/output interface 11 to the card 1 and an input/output interface 13 to the host machine 12, for example an RS232C serial interface. Each of these units 8 to 13 are connected by appropriate data and address buses.

Figure 2:
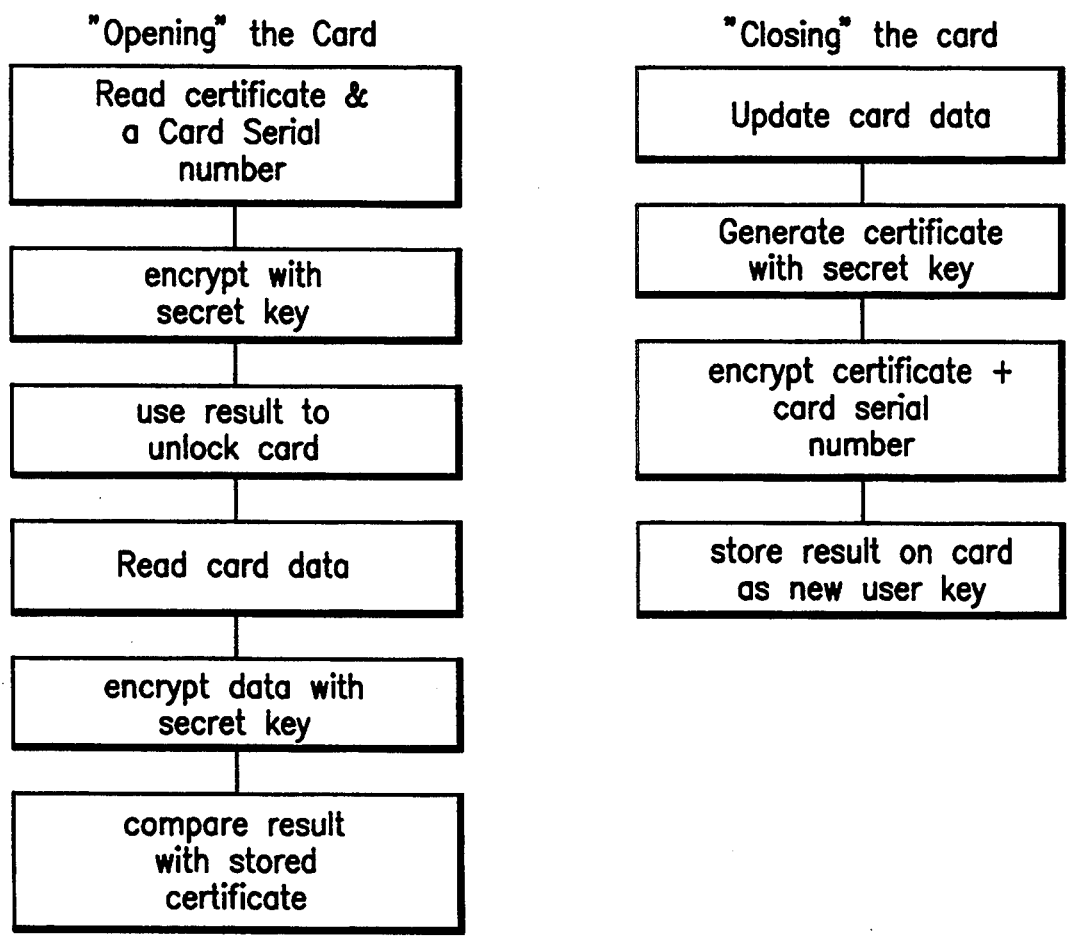
FIG. 2 is a generalised flow chart of the operation of the validation device of FIG. 1.

FIG. 2 shows a generalised flow chart of a preferred system embodying the present invention. In particular, FIG. 2 illustrates the procedure for validation of the card whereby access to the data within may be obtained. Initially, a certificate and card serial number are read from unprotected memory. This information is then encrypted with the aid of a secret encryption key stored in read only memory or read/write memory within the validation device. The result of the encryption is transmitted to the smartcard as a user key or PIN to unlock the card.

Thereafter, protected memory may be accessed and card data read. The validation procedure continues by encrypting the card data obtained in the previous step, again with the aid of the secret encryption key. In the final step of validating card access, the certificate obtained from unprotected memory is compared with the result of encrypting card data. If the parameters are equal then access is validated and the card data may be employed to perform transactions and the like according the function of the card.

FIG. 2 also illustrates the procedure for locking the card. When it is determined that card access must be terminated, for example after a transaction is completed, the card data is updated. A fresh certificate is generated by encrypting the new card data with the aid of the secret key as before. The certificate is combined with a card serial number and further encrypted, once more with the aid of the secret encryption key to produce a new user key. The new user key is stored in write only memory. The advantage of generating a new user key each time the card is used is to increase the security of access to the card. In addition, the new certificate provides protection against copying the card. A major advantage of the invention however is that no information need be memorized by the user of the card. This means of course that the validation device when used with transaction card, requires the card to be treated just as money is treated. It will be appreciated that the effect of the invention is not to provide a system secure against unauthorised use, but to prevent tampering with the data stored in the smartcard.

Figure 3:
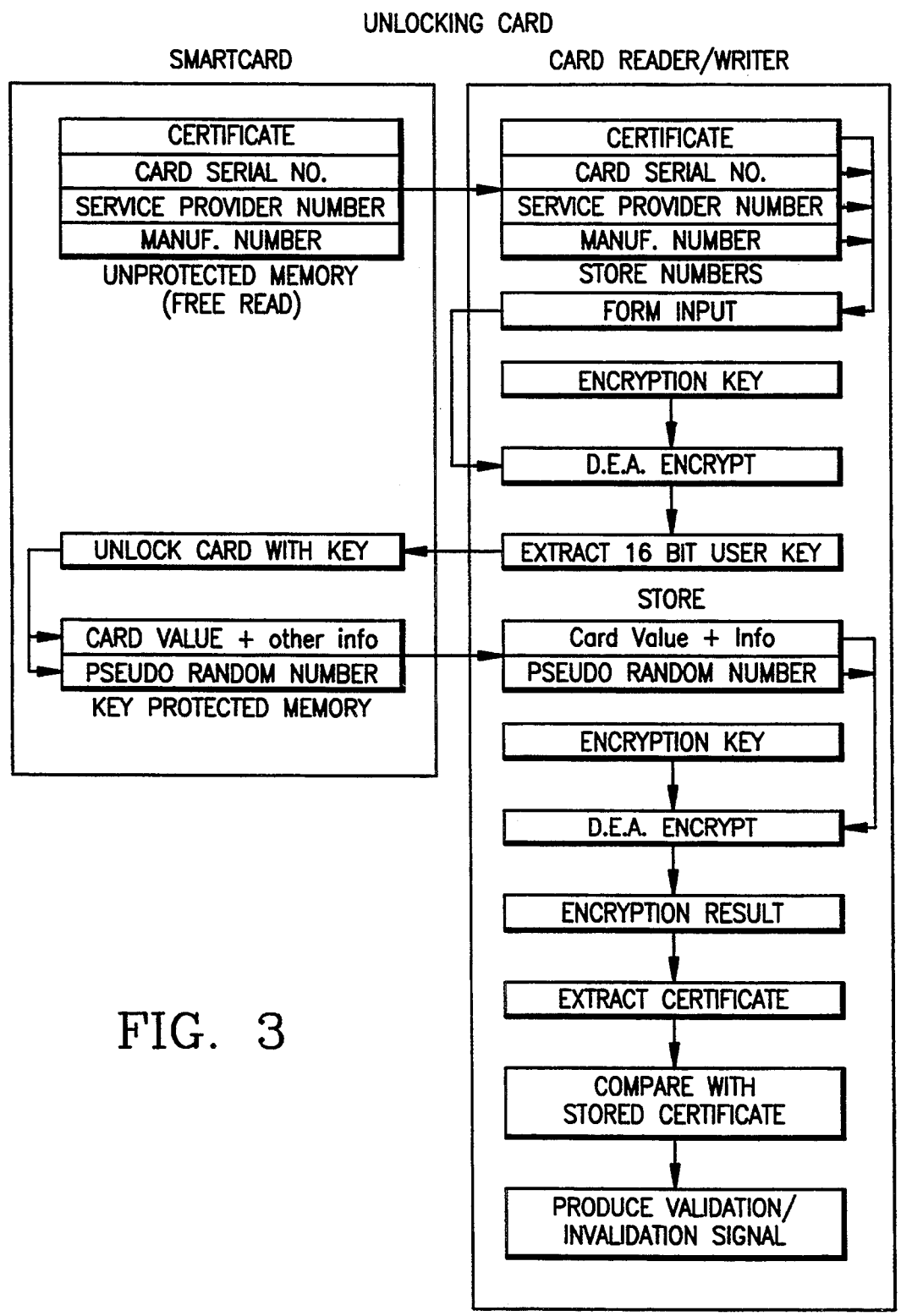
FIG. 3 shows a more detailed flow chart of the unlocking function of FIG. 2.

FIG. 3 illustrates in more detail and with particular reference to the application of the invention to the management of gaming machines.

Initially a card user inserts the card into a host machine. A card reader/writer as shown in FIG. 1 reads identification data from the unprotected memory. This identification data takes the form of a certificate, a card serial number, a service provider number and a manufacturer's number. The identification data is taken and stored in RAM 9 within the card reader/writer 2.

These values form the input to an encryption algorithm, for example the data encryption algorithm (DEA as specified in AUSTRALIAN STANDARD 2805.5 or similar). In addition a secret encryption key is held within the reader/writer 2 by ROM 10 or RAM 9. From the output of the encryption algorithm a 16 bit user key is extracted and transmitted to the smartcard to unlock or enable protected memory 5.

If the card is successfully unlocked, the certificate area of unprotected memory 4 is erased and the data within protected memory is read and stored in RAM 9 of the reader/writer. This data typically consists of the cards monetary value and other sensitive data according the particular application.

The card data forms the input to an encryption algorithm once more employing the encryption key stored in ROM to produce validating data for comparison with the certificate stored earlier. If the certificate and validating data are identical the transaction involving the smartcard may proceed. Otherwise, the card has been tampered with and the transaction is terminated.

If the card is validated by the reader/writer, the monetary value and any other pertinent information is transferred to the host machine via the interface with the reader. After the transaction is successfully completed the card must be locked in accordance with the invention to ensure security of the information it contains.

Figure 4:
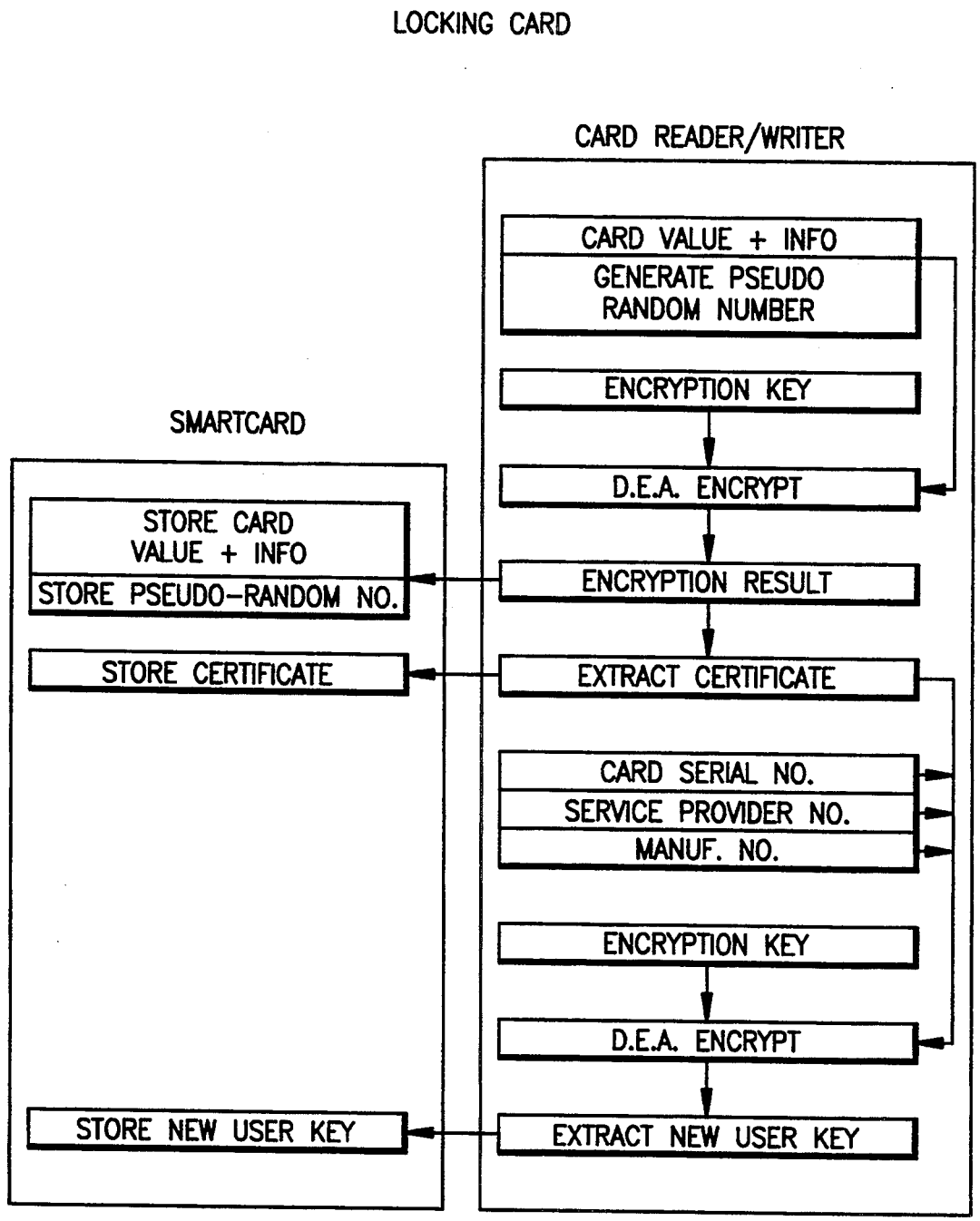
FIG. 4 shows a more detailed flow chart of locking function of FIG. 2.

FIG. 4 illustrates a detailed procedure for locking the card.

Updated data is transferred from the host machine to the protected memory of the smartcard. At the same time, this data is encrypted and a certificate extracted and written to the unprotected memory of the smartcard.

The certificate is combined also with the other parameters such as card serial number, service provider number and manufacturer's number read during opening of the card to form the input to a further encryption. From the result of this second encryption a new user key is extracted and transferred to the smartcard. It will be apparent that further security may be provided by encrypting the card data representing monetary value and the like. Even greater protection would be provided by employing several different encryption algorithms or encryption keys. In practice however the difficulty of breaking the standard data encryption algorithm is such that each encryption performed by the invention may be achieved with the same algorithm and key.

It will be appreciated also that the great advantage of the present invention is that it relieves the user of the burden of remembering a PIN. In systems where key information is provided by the user, the information must be limited in complexity to that which the average user can remember. Thus, the simplicity of user supplied pins renders these systems more susceptible to interference.

Since a PIN is not required by the use of the present invention it is also not necessary to provide a PIN pad on the apparatus to be operated. This can be of considerable advantages in applications where there is insufficient physical space for such a key pad or where the operating environment renders otherwise undesirable to such a key pad. Additionally, the avoidance of the use of a PIN renders the present system particularly suited to short lived cards. In situations where cards have a short life and a high turnover it is not feasable for a user to easily to remember a PIN. The present invention allows the elimination of a PIN and thus is especially suited to the short lived applications.

It will be apparent that a validation device of the present invention allows a smartcard to be used as a substitute for cash. Accordingly, unauthorised use of the card is possible. However it is possible and indeed desirable, to incorporate unique markings such as service provider identification, member number, personal signature etc. on the surface of the smartcard in order to minimise this type of misuse. It will be apparent that in a variety of applications the prevention of tampering is often more important than the possibility of unauthorised use.

Although reference has been made to specific examples, it will be appreciated by those skilled in the art that the invention may be embodied in many other ways.

We claim:

1. A validation device for a smartcard of the kind having unprotected data storage memory and protected data storage memory selectively accessible by means of a user access code, said device comprising:

encryption means to perform an encryption upon identification data to produce said user access code;

means to read identification data from said unprotected memory to said encryption means;

means to supply said access code to the smartcard to obtain access to said protected memory;

means to read selected data from said protected memory to said encryption means for encryption to produce validating data;

comparator means to compare said identification data with said validating data and reject the smartcard if the data do not agree; and means responsive to said comparator means to indicate validation of said protected memory data if the data do agree.

2. A device as claimed in claim 1 further comprising memory means for storage of said identification data and wherein said means to read identification data from said unprotected memory erases the identification data from said unprotected memory after reading to said memory means.

3. A device as claimed in claim 1 wherein said encryption means performs the same encryption algorithm to produce said user access code and said validating data.

4. A device as claimed in claim 3, wherein said encryption algorithm employs an encryption key stored in memory.

5. A device as claimed in any one of claim 1, further comprising card locking means responsive to an input indication of termination of use of the said smartcard to read updated selected data from said protected memory to said encryption means for encryption to produce updated validating data;

and means to write said updated validating data to said unprotected memory to form part of updated identification data.

6. A device as claimed in claim 5, wherein said card locking means generates a new user access code for said smartcard by encryption of said updated identification data and transmits said new user access code to said smartcard.

7. A method for validating access to smartcards of the kind having unprotected data storage memory and protected data storage memory selectively accessible by means of a user access code, said method including the steps of:

reading identification data from said unprotected memory;

encrypting said identification data to produce a user access code;

supplying said user access code to said smartcard;

reading selected data from said protected memory;

encrypting said selected data to produce validating data;

comparing said identification data with said validating data; and rejecting the smartcard if the data do not agree and validating said protected memory data if the data do agree.

8. A method as claimed in claim 7 further including the step of storing the identification data and consequently erasing the identification data from the unprotected memory.

9. A method as claimed in claim 8, further including the steps of encrypting the identification data and encrypting selected data from the protected memory employ the same encryption algorithm to produce the user access code and the validating data respectively.

10. A method as claimed in any one of claim 7, wherein the encryption steps employ an encryption key stored in memory.

11. A gaming machine operated by a smartcard by means of a validation device according to claim 1.

* * * * *